(12) United States Patent
Alsohaily et al.

(10) Patent No.: US 10,117,110 B2
(45) Date of Patent: *Oct. 30, 2018

(54) STRUCTURING AND METHOD FOR WIRELESS RADIO ACCESS NETWORK DEPLOYMENT

(71) Applicants: Ahmed Alsohaily, Toronto (CA); Elvino Silveira Medina de Sousa, Toronto (CA)

(72) Inventors: Ahmed Alsohaily, Toronto (CA); Elvino Silveira Medina de Sousa, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/704,674

(22) Filed: Sep. 14, 2017

(65) Prior Publication Data

US 2018/0007560 A1 Jan. 4, 2018

Related U.S. Application Data

(63) Continuation of application No. 14/702,886, filed on May 4, 2015, now Pat. No. 9,813,917.

(51) Int. Cl.
*H04W 16/18* (2009.01)
*H04W 24/02* (2009.01)

(52) U.S. Cl.
CPC ............ *H04W 16/18* (2013.01); *H04W 24/02* (2013.01)

(58) Field of Classification Search
CPC .............................. H04W 16/18; H04W 24/02
See application file for complete search history.

(56) References Cited

U.S. PATENT DOCUMENTS

| | | | |
|---|---|---|---|
| 9,094,886 B2 * | 7/2015 | Jang ...................... | H04W 36/22 |
| 9,813,917 B2 * | 11/2017 | Alsohaily ............. | H04W 16/18 |
| 2015/0065103 A1 | 3/2015 | Moncomble et al. | |
| 2015/0065106 A1 * | 3/2015 | Catovic .................. | H04W 8/22 |
| | | | 455/418 |
| 2015/0117347 A1 * | 4/2015 | Iwai ...................... | H04W 28/24 |
| | | | 370/329 |
| 2015/0195745 A1 * | 7/2015 | Farmanbar ............ | H04W 28/12 |
| | | | 370/236 |
| 2016/0262154 A1 * | 9/2016 | Alsohaily ............. | H04W 16/14 |

* cited by examiner

*Primary Examiner* — Brandon J Miller
(74) *Attorney, Agent, or Firm* — Bhole IP Law; Anil Bhole; Marc Lampert

(57) ABSTRACT

A structuring and deployment method is provided for a radio access network in a cellular wireless communication system, employing a single or plurality of Radio Access Technologies (RATs). The method consists of: Unifying the performance of non-Radio Transmission Functions (non-RTFs) in multi-RAT systems; providing a flexible RAN topology, comprising reconfigurable Connection Points (CPs) that may be supplemented by reconfigurable RAN Functional Elements (RFEs), that is capable of adapting to system deployment environments; Reconfiguration of the implementation of RAN functions based on changes in the available system hardware and links.

16 Claims, 6 Drawing Sheets

STRUCTURING AND METHOD FOR WIRELESS RADIO ACCESS NETWORK DEPLOYMENT

TECHNICAL FIELD

The following relates generally to the structuring and deployment of wireless communication systems and more specifically to radio access network structuring and deployment.

BACKGROUND

Specific radio frequency bands are set aside for wireless cellular communications by spectrum regulatory authorities (such as the Federal Communications Commission in the United States of America) to ensure the reliable operation of cellular communication systems, and are referred to as cellular bands. The term 'spectrum' is commonly used to refer to the aggregate bands that are assigned to the cellular communication network, also referred to as the cellular communication system, in any given jurisdiction. Another analogous phrase to spectrum is radio frequency resources.

Cellular bands can be contiguous or non-contiguous and are typically divided into sub-bands, which again can be contiguous or non-contiguous, that are licensed to mobile network operators. A mobile network operator thus deploys the network infrastructure of a cellular communication system, comprising a Radio Access Network (RAN) and a Core Network (CN), upon obtaining a spectrum utilization license, i.e. a license to use a particular cellular band or sub-band. The RAN connects User Equipment (UE) to the CN, where cellular communication systems are interconnected with other communication systems.

A RAN typically comprises processing units and equipment (such as antennas, circuits, connecting cables, etc.) that perform Radio Transmission Functions (RTFs) in addition to other functions, referred to as non-Radio Transmission Functions (non-RTFs).

SUMMARY

In one aspect, a radio access network is provided, the radio access network comprising: a plurality of radio transmission function components, each radio transmission function component configured to provide a radio transmission function for a radio access technology for linking user equipment operating on the radio access technology to the radio access network; and a unified non-radio transmission function component linked to the plurality of radio transmission function components, the unified non-radio transmission function component providing non-radio transmission functions jointly for all employed radio access technologies in the radio access network.

In another aspect, a radio access network is provided, the radio access network comprising: one or more reconfigurable connection points each configured to provide all or a subset of radio transmission functions for one or more radio access technology for linking user equipment operating on the radio access technology to the radio access network and optionally to provide all or a subset of non-radio transmission functions to enable communication between the user equipment and a core network linked to the radio access network; and one or more reconfigurable radio access network functional elements linked to one or more of the reconfigurable connection points, each radio access network functional element configured to provide all or a subset of the radio transmission functions and non-radio transmission functions that are not provided by the linked reconfigurable connection points such that all radio transmission functions and non-radio transmission functions are provided to all reconfigurable connection points.

In another aspect, a method of deploying a radio access network is provided, the method comprising: deploying a plurality of radio transmission function components, each radio transmission component configured to provide a radio transmission function for a radio access technology for linking user equipment operating on the radio access technology to the radio access network; and deploying a unified non-radio transmission function component linked to the plurality of radio transmission function components, the unified non-radio transmission function component providing non-radio transmission functions jointly for all employed radio access technologies in the radio access network.

In another aspect, a method of deploying a radio access network is provided, the method comprising deploying: one or more reconfigurable connection points each configured to provide all or a subset of radio transmission functions for one or more radio access technology for linking user equipment operating on the radio access technology to the radio access network and optionally to provide all or a subset of non-radio transmission functions to enable communication between the user equipment and a core network linked to the radio access network; and one or more reconfigurable radio access network functional elements linked to one or more of the reconfigurable connection points, each radio access network functional element configured to provide all or a subset of the radio transmission functions and non-radio transmission functions that are not provided by the linked reconfigurable connection points such that all radio transmission functions and non-radio transmission functions are provided to all reconfigurable connection points.

In yet another aspect, a unified Radio Access Network (RAN) functional structure for a multi-Radio Access Technology (RAT) cellular wireless communication system is provided, the structure comprising: Unified non-Radio Transmission Functions (non-RTFs) that jointly perform non-RTFs for all employed RATs and Radio Transmission Functions (RTFs) for each of the employed RATs, with the introduction of a new RAT in the system being realized by integrating the RTFs of the new RAT with the unified non-RTFs.

In a further aspect, a flexible RAN topology to enable the implementation of RAN RTFs and non-RTFs in a cellular wireless communication system is provided, the topology comprising reconfigurable Connection Points (CPs) that may connect to a single or plurality of CPs and/or reconfigurable RAN Functional Elements (RFEs), with CPs configured to: provide connectivity to User Equipment (UE), using a single or plurality of RATs, through wireless signal transmission and reception; perform all or a portion of RTFs and all or a portion of non-RTFs, with a single or a plurality of RFEs performing RAN functions not performed at a CP. RAN function implementation in the flexible RAN topology is adapted at different system locations based on the target deployment costs and the deployment environment, namely the capabilities of available CPs, RFEs and network links at different locations.

In yet a further aspect, additional CPs and/or RFEs, along with associated system links, may be introduced or removed in the flexible RAN topology as necessary based on RAN function implementation requirements, with RAN function implementation in the flexible RAN topology also adapted to take advantage of hardware upgrades to CPs, RFEs and/or system links or to compensate for system link loss and/or CP/RFE failure.

These and other embodiments are contemplated and described herein. It will be appreciated that the foregoing summary sets out representative aspects of systems and methods for cryptographic suite management to assist skilled readers in understanding the following detailed description.

DESCRIPTION OF THE DRAWINGS

A greater understanding of the embodiments will be had with reference to the Figures, in which.

DETAILED DESCRIPTION

Figure 1:
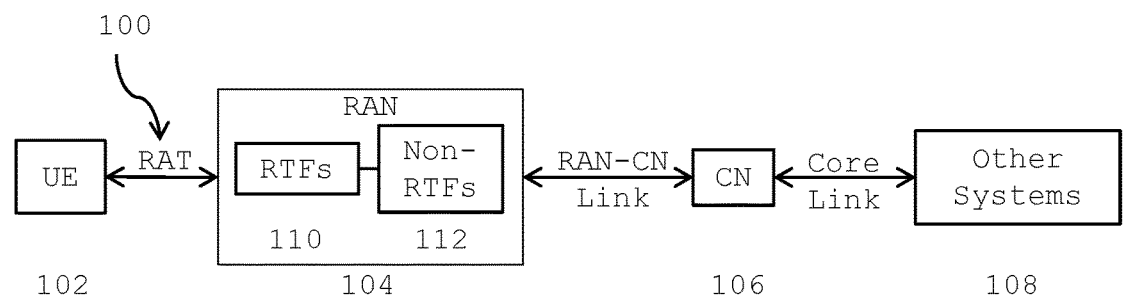
FIG. 1 illustrates an exemplary block diagram of a cellular communication system employing a single RAT.

It will be appreciated that for simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practised without these specific details. In other instances, well-known methods, procedures and components have not been described in detail so as not to obscure the embodiments described herein. Also, the description is not to be considered as limiting the scope of the embodiments described herein.

It will be appreciated that various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender. Further definitions for terms may be set out herein; these may apply to prior and subsequent instances of those terms, as will be understood from a reading of the present description.

It will be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following obviates or mitigates some or all of the issues introduced by rigid structuring of RAN topologies, particularly those that support multiple radio access technologies (RATs), including potentially redundant duplication and disjoint operation of RAN functions in multi-RAT systems, limiting the feasibility of introducing new RAN functions, limiting the scalability of multi-RAT systems, substantially increasing system deployment cost and operational complexity and sub-optimal utilization of the system infrastructure hardware and radio resources. In suitable implementations, the following may provide flexible, scalable RAN structuring and deployment means to provide multi-RAT systems with the flexibility to adapt to deployment environments, efficient introduction of new functions and RATs, increased efficiency and utilization of system infrastructure hardware and radio resources and reduction in system deployment cost and operational complexity.

The following provides systems and methods for wireless radio access network structuring and deployment. In one aspect, a unified Radio Access Network (RAN) functional structure for a multi-RAT cellular wireless communication system is provided, the structure comprising: a unified non-RTF component that jointly performs non-RTFs for all employed RATs communicatively linked to one or more RTFs supporting each of the employed RATs, with the introduction of a new RAT in the system being realized by integrating the RTFs of the new RAT with the unified non-RTF component.

RTFs comprise, but are not limited to: wireless signal transmission and reception, using antennas housed in radio heads; modulation and demodulation of wireless signals using carrier modem circuits; baseband processing of data using baseband processors; and synchronization of system users in frequency and time using synchronization circuits.

Non-RTFs comprise, but are not limited to: System Access Control (SAC) functions, Radio Resource Management (RRM) and User Mobility Management (UMM). SAC functions enable admission of authenticated users to access and utilize system resources using system user registries. RRM includes determining which system users have access to radio frequency resources at any time using scheduling functions, with opportunistic scheduling commonly employed in data cellular systems to exploit wireless channel variations. UMM includes maintaining connectivity of mobile users through user connection handover; paging system users to contact the RAN to initiate data transmission sessions; and user location positioning to enable location-based services.

In another aspect, a flexible RAN topology to enable the implementation of RAN RTFs and non-RTFs in a cellular wireless communication system is provided, the topology comprising reconfigurable Connection Points (CPs) that may connect to one or more other CPs and/or reconfigurable RAN Functional Elements (RFEs), with CPs configured to: provide connectivity to User Equipment (UE), using a single or plurality of RATs, through wireless signal transmission and reception; perform all or a portion of RTFs and all or a portion of non-RTFs, with a single or a plurality of RFEs performing RAN functions not performed at a CP. RAN function implementation in the flexible RAN topology is adapted at different system locations based on the target deployment costs and the deployment environment, namely the capabilities of available CPs, RFEs and network links at different locations.

In yet another aspect, additional CPs and/or RFEs, along with associated system links, may be introduced or removed in the flexible RAN topology as necessary based on RAN function implementation requirements, with RAN function implementation in the flexible RAN topology also adapted to take advantage of hardware upgrades to CPs, RFEs and/or system links or to compensate for system link loss and or CP/RFE failure.

Referring now to FIG. 1, an exemplary network structure (100) for wireless cellular communication systems is shown. The network comprises a RAN (104) linked to a CN (106). The RAN is deployed to wirelessly connect UE (102) to the CN (106). The RAN (104) carries user traffic to the CN (106), where cellular systems are connected with other communication systems (108), and user traffic management at the CN (106) is independent of traffic originating system. A RAN typically comprises processing units and equipment (such as antennas, circuits, connecting cables, etc.) that perform RTFs (110) and non-RTFs (112).

Connection of UE to the RAN is facilitated by a wireless radio air interface, referred to as the RAT, which utilizes a specific amount of spectrum. A RAT is characterized by the required transmission bandwidth, transmission frame duration, frequency reuse factor between system APs/RUs, user multiple access scheme, modulation and coding configurations along with the transmission and reception protocols required to achieve communication over the electromagnetic wireless transmission medium. Due to the limited amount of spectrum available for cellular systems, RATs are typically designed with the objective of enabling maximal spectrum reuse at all system APs/RUs while having the highest possible spectral efficiency.

The employment of a RAT in a cellular communication system is typically carried out through the deployment of a RAN. When employing multiple RATs in a cellular communication system, the RANs of employed RATs are typically collocated on the same physical locations to reduce deployment costs. While characteristics of RTFs are determined by the employed RAT, non-RTFs are independent of the RAT used to connect UE, i.e. multi-RAT systems are characterized by the redundant duplication of non-RTFs for all co-deployed RATs.

Variations in the capabilities of UE require the co-deployment of multiple RATs in cellular communication systems. This consequently requires the partitioning of spectrum between co-deployed RATs. In most implementations, each RAT is assigned one or more blocks of spectrum, the bandwidth for each RAT typically being determined at the time of deployment, and perhaps reconfigured from time to time, to reflect typical usage of those RATs in the network. Depending on the system traffic dynamics, spectrum partitioning between co-deployed RATs can be applied at the system level, i.e. all system APs/RUs have the same spectrum partitioning between co-deployed RATs, or independently at individual APs/RUs or groups of APs/RUs. A cellular communication system could support one or more RATs and generally assigns bands or sub-bands to each of the employed RATs using a configuration that is typically based on a historical, current and/or projected usage for each RAT; RATs with more usage would be assigned more spectrum, and vice versa.

The rigid structuring of RAN topologies to consist of either one or two sets of elements often imposes strict requirements on the processing capabilities of RAN elements and the performance of links between RAN elements, limits the feasibility of introducing new RAN functions and, depending on the RAN deployment environment, results in large RAN deployment costs. Moreover, the structuring of multi-RAT systems as independent single-RAT subsystems, in spite of the redundant duplication of non-RTFs, often further increases system deployment costs, operational complexity and results in the suboptimal utilization of system network infrastructure and radio frequency resources. In addition, such a structuring may limit the scalability of multi-RAT systems; as the deployment of a new RAT is equivalent to a new system deployment.

The implementation requirements for RAN functions are determined based on the overall system performance requirements, and are typically specified in terms of required processing capabilities of the elements performing a RAN function, i.e. processing time, along with the amount of data required to be available for performing a RAN function and the maximum timeframe to provide the required data to the elements performing a RAN function. The RAN function implementation requirements thus determine the required processing capabilities of RAN elements in addition to the performance requirements for links between RAN elements.

Links connecting RAN elements can be wired or wireless, with link performance characterized by link capacity, link latency and delay jitter. Link capacity is the maximum number of bits that can be reliably transferred over the transmission medium in a time unit, typically measured in bits per second. Link latency is the time required to move a bit from one end of the link to another, typically measured in seconds or parts of a second. Delay jitter specifies the variation in link latency and is used to determine the stability and reliability of a link.

Figure 2:
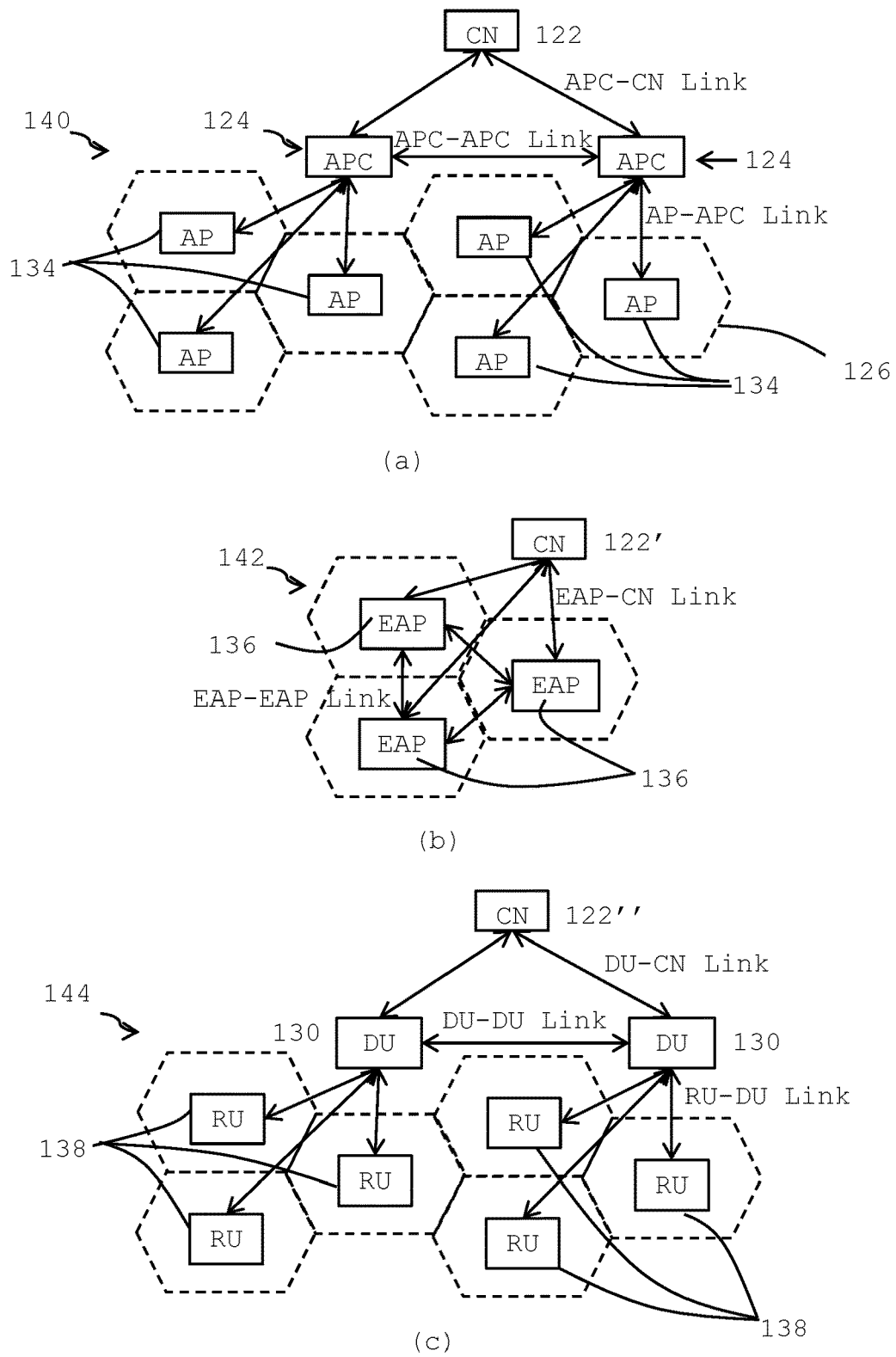
FIG. 2 illustrates the architectural structure of three rigid RAN topologies.

FIG. 2 illustrates three common topologies employed to implement RAN functions in cellular communication systems, namely the two-level distributed RAN, flat distributed RAN and centralized RAN, with an employed RAN topology typically implemented at the system level, i.e. for the entire system.

In FIG. 2(a), a two-level distributed RAN (140) consists of Access Points (APs) (134) that perform RTFs; and Access Point Controllers (APCs) (124) that perform non-RTFs and carry user traffic to the CN (122). APs, also referred to as base stations, are deployed to cover specific geographical areas, referred to as cells (126), and wirelessly connect UE. APCs connect to the CN and each APC typically connects a group of APs, with the number of APs connected by an APC determined by the processing capabilities of the APC and the performance of links between APs and the APC. Furthermore, APCs connecting adjacent groups of APs are interconnected.

FIG. 2(b) illustrates a flat RAN topology (142) where the previously described APC units are embedded into APs to form Enhanced APs (EAPs) (136) that perform all RAN functions, with EAPs connecting directly to the CN (122') and adjacent EAPs.

FIG. 2(c) illustrates the centralized RAN topology (144), which consists of Radio Units (RUs) (138) comprising radio heads, that perform wireless signal transmission and reception only, while connecting to centralized Digital Units (DUs) (130), connected to the CN (122"), where all components performing all other RAN functions are implemented. As in the case of the two-level distributed RAN, DUs connect to the CN and DUs connecting adjacent RUs are interconnected. However, unlike the two-level distributed RAN, the number of RUs connecting to DUs typically significantly larger than the number of APs connecting to an APC.

The choice of RAN topology typically depends on the performance of available network infrastructure hardware and quality of links between network infrastructure elements.

The minimum required processing capabilities of a RAN element is determined by the type and scale of functions implemented in the RAN. Subsequently, DUs in the centralized RAN topology have the highest requirements on processing capabilities; as DUs perform all RAN functions aside from wireless signal transmission and reception for a significantly large number of RUs. A centralized RAN also requires the highest performance for links between RUs and DUs when compared to distributed RAN topologies; as the transmission of unprocessed transmission signals requires a significantly large amount of bandwidth (up to orders of magnitude) when compared the transmission of processed data in distributed RAN functions.

When compared to the centralized RAN topology, the flat distributed RAN topology has lower implementation requirements followed by the two-level distributed RAN topology. Therefore, a centralized RAN topology is normally employed only when high processing performance DUs, along with high performance links between RUs and DUs, are available. On the other hand, the lack of DUs with high processing capabilities or links satisfying the requirements of the centralized RAN topology typically mandates the employment of a distributed RAN topology.

The rigid structuring of RAN topologies limits the flexibility of RAN deployment in cellular communication systems. When the deployment environment does not allow for the employment of a specific topology at the system level, interfaces are required between different RAN topologies to ensure that RAN function implementation is not disrupted.

Figure 3:
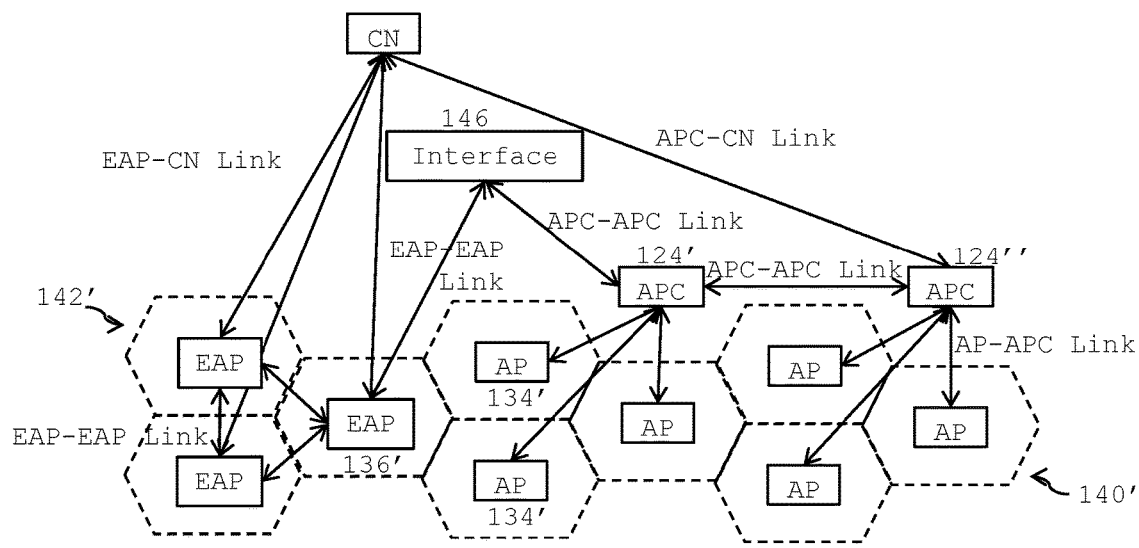
FIG. 3 illustrates the connection of different RAN topologies through an interface.

FIG. 3 shows an example of a RAN deployment scenario where a flat distributed RAN topology (142') is employed at a portion of the system while a two-level distributed RAN topology (140') is employed at another portion of the system. EAPs (136') serving cells adjacent to cells served by APs (134') are connected to the APC (124') connecting such APs (134') through an interface (146). The interface (146) facilitates the implementation of RAN functions spanning adjacent cells such that the change in RAN topology is transparent to RAN elements, i.e. the interface (146) maps the data sent from the EAP (136') to the APC (124') such that the data received by the APC (124') from the EAP (136') is equivalent to data received from other APCs (124") and vice versa, to ensure that the operation of RAN elements is unaffected by topology mismatching.

However, the employment of an interface between RAN elements of different topologies increases the delay in information exchange between such elements, due to the additional data processing, and thus increases the requirements on the hardware and links connecting such elements to compensate for the added delay. Therefore, the employment of multiple RAN topologies is often avoided due to the higher deployment requirements, costs and added complexity.

Figure 4:
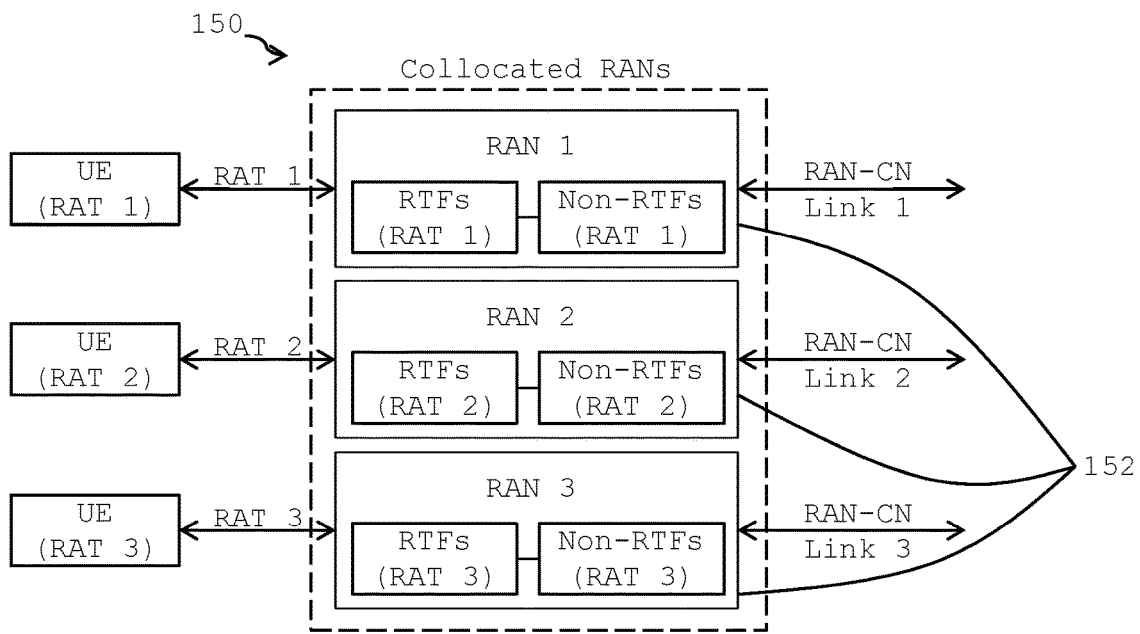
FIG. 4 illustrates an exemplary RAN employing a disjoint functional structure to support three RATs.

FIG. 4 shows another typical multi-RAT RAN structure, referred to as the disjoint structure, co-deploying three RATs (150). For each of the employed RATs, all RAN functions are independently implemented and performed using a single-RAT RAN (152), with single-RAT RANs (152) collocated on the same physical locations to reduce deployment costs. RANs of employed RATs can adopt any of the aforementioned RAN topologies.

In the disjoint structure, the introduction of a new RAT thus requires the deployment of a new RAN to implement the new RAT's RAN functions. Furthermore, enhancements to RAN functions are independently implemented for each individual RAT. Hence, the adoption of a disjoint structure in a multi-RAT system results in large deployment costs and operational complexity while providing limited scalability to introduce new RATs.

Figure 5:
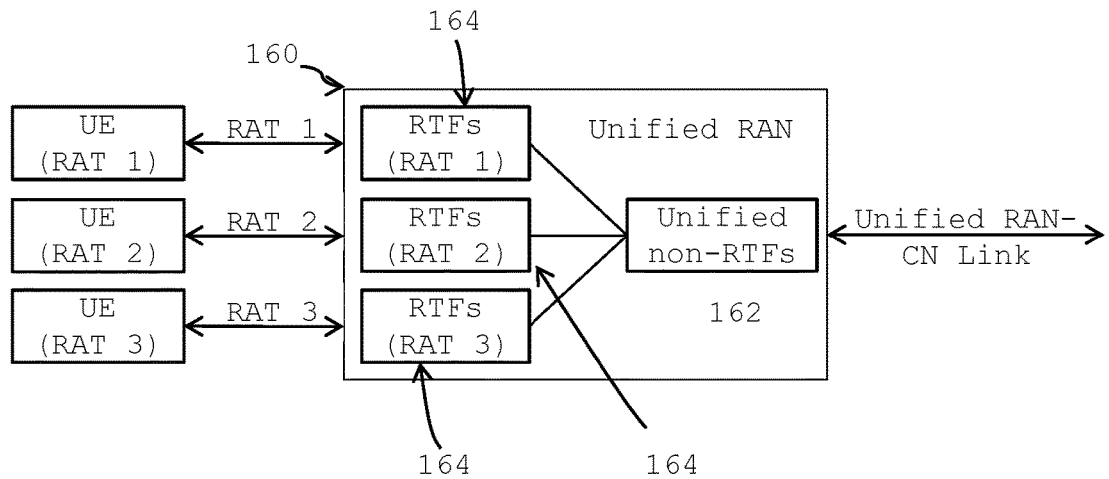
FIG. 5 illustrates an exemplary RAN employing a unified functional structure to support three RATs.

Referring now to FIG. 5, a unified RAN structure for a multi-RAT system employing three RATs is shown (160). It should be understood that the employment of three RATs is for illustrative purposes only and that other numbers of employed RATs is contemplated.

Unlike the disjoint structure of FIG. 3, in the unified RAN structure the non-RTFs (162) are jointly performed for all co-deployed RATs; as they are independent of the RAT used to connect UE. RTFs of individual RATs (164) connect to the unified non-RTFs (162). The introduction of a new RAT is thus facilitated by integrating the RTFs of the new RAT with the unified non-RTFs (162), rather than requiring the deployment of a single-RAT RAN, thus substantially increasing system scalability.

In addition to significantly reducing system deployment costs and operational complexity, the joint performance of non-RTFs allows for better utilization of system resources; as it allows for the global optimization of the utilization of all system resources, including radio frequency resources, as opposed to independently optimizing the utilization of portions of system resources in a disjoint structure. Furthermore, unlike the disjoint structure, all RATs benefit from enhancements to unified non-RTFs.

Unlike rigid RAN topologies, where the same topology is implemented at the system level (with mapping interfaces required to connect different topologies), the flexible RAN topology adapts RAN function implementation to the deployment environment, i.e. RAN functions can be implemented independently over a single or plurality of RAN elements at different locations based on the capabilities of the available network infrastructure hardware and system links, without requiring the use of mapping interfaces.

Figure 6:
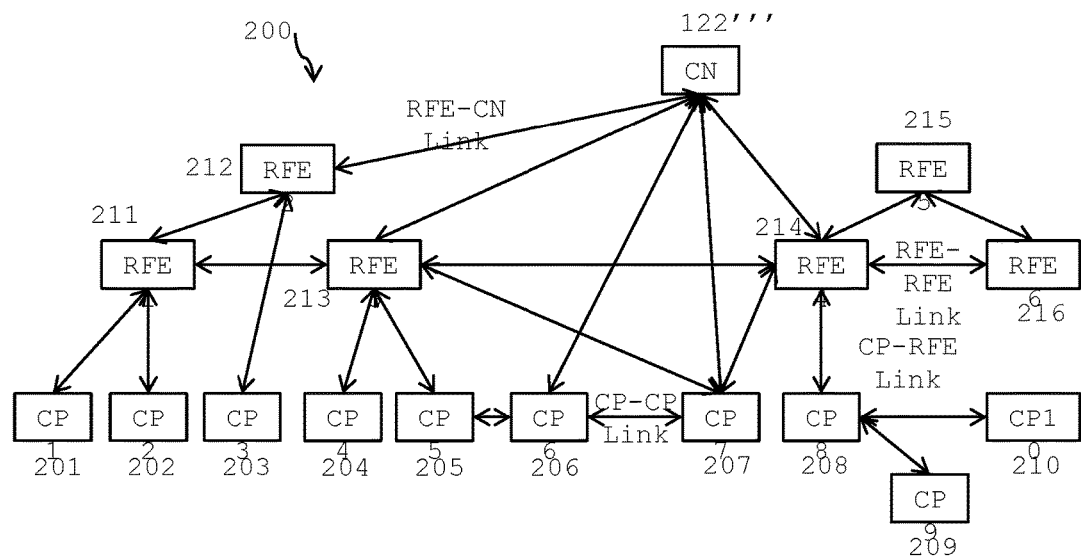
FIG. 6 illustrates an architectural structure of a flexible RAN topology.

Referring now to FIG. 6, an exemplary flexible RAN topology comprises reconfigurable Connection Points (CPs) that may be complemented by reconfigurable RAN Functional Elements (RFEs).

A CP is defined as an element that wirelessly connects UE to the RAN. CPs perform functions comprising, but are not limited to, wireless signal transmission and reception for all employed RATs. The functionality of CPs is determined by the required system performance in addition to the capabilities of network infrastructure hardware and available system links; which are, in return, determined by the system deployment environment and target deployment costs.

CPs can be classified based on the amount of RAN functions they can perform. At one extreme, all RAN functions may be implemented in a high performing/class CP, i.e. similar to EAPs in the flat distributed RAN topology. On the other extreme, functionality of a low performing/class CP could be abstracted to wireless signal transmission and reception, i.e. similar to RUs in the centralized RAN topology. However, unlike the centralized RAN topology, remaining RAN functions need not be performed at a single RAN element.

When a CP does not perform all RAN functions, it connects to a single or plurality of RAN Functional Elements (RFEs) that perform remaining RAN functions. Unlike rigid RAN topologies, a CP can perform all or a portion of RTFs in addition to all or a portion of non-RTFs, with remaining RAN functions implemented at RFEs.

Similar to CPs, the classification, i.e. functionality, of RFEs is determined by the processing capabilities of RFEs. Additionally, the capabilities of RFEs need not be equal. High performing/class RFEs can perform a larger number of RAN functions than lower performing/class RFEs, i.e. the number of RAN functions performed at different RFE classes need not be equal. Furthermore, the number of CPs connecting to different RFEs need not be equal, i.e. a high performing/class RFE with high performing links can perform the same RAN functions for a larger number of CPs when compared to lower performing/class RFE with lower performing links.

The implementation of RAN functions in the flexible RAN topology is determined based on the capabilities of network elements (RFEs and/or CPs) in addition to the performance of available system links. Implementation of RAN functions at certain system areas may be carried out using CPs only. On the other hand, CPs may be complimented by RFEs at other areas to reduce system deployment costs, circumvent system link limitations and/or circumvent CP hardware limitations. Focus when deploying a flexible RAN topology is on enabling the implementation of RAN functions, based on the RAN deployment environment, in the most efficient and cost effective manner while satisfying the system performance requirements.

Referring again to FIG. 6, an abstraction of an implementation of a flexible RAN topology is now provided through an example of a RAN employing 10 CPs complemented by 6 RFEs. It should be understood that the provided setup in this example is for illustrative purposes only and that other setups and configurations are contemplated. In this example, CP1 (201) and CP2 (202) are capable of performing wireless signal transmission, reception, modulation and demodulation, while CP3 (203), CP4 (204), CP5 (205), CP8 (208) and CP10 (210) are capable of performing all RTFs. CP6 (206) and CP7 (207) are capable of performing all RAN functions while CP9 (209) is capable of wireless signal transmission and reception only.

RFE1 (211) is introduced to complement the operation of CP1 (201) and CP2 (202) by performing remaining RTFs. Assuming RFE1 (211) is incapable of performing non-RTFs, RFE1 (211) is complemented by RFE2 (212), capable of performing non-RTFs for three CPs, where all non-RTF functions are performed for CP1 (201) and CP2 (202). CP3 (203) thus also connects to RFE2 (212) to perform required non-RTFs. RFE3 (213) is introduced to perform non-RTFs for CP4 (204) and CP5 (205) and connects to RFE2 (212) through RFE1 (211) to enable performing RAN functions spanning multiple CPs (such as coordinated transmission), i.e. RFE1 (211) acts as a connection node between RFE2 (212) and RFE3 (213). CP6 (206) and CP7 (207) directly connect to the CN (122''') as they are capable of performing all RAN functions, with CP5 (205) connected to RFE3 (213) and RFE4 (214) to enable the implementation of RAN functions spanning multiple CPs. To compensate for the lack of links between CP6 (207), RFE3 (213) and RFE4 (204), CP5 (205) acts as a connection node between CP6 (207) and RFE3 (213) while CP7 (207) acts as a connection node between CP6 (207) and RFE4 (214). RFE4 (214), RFE5 (215) and RFE6 (216) collectively perform the non-RTFs for CP8 (208), CP9 (209) and CP10 (210), with CP8 (208) performing remaining RTFs for CP9 (209) while acting as a connection node between CP10 (210) and RFE4 (214), RFE5 (215) and RFE6 (216).

Thus the deployment is flexible and can accommodate existing and newly introduced CPs with varying RTF capabilities and requirements.

Further, the hardware of specific RFEs and/or CPs may be upgraded to introduce a new RAN function, enhance an existing RAN function and/or reduce system operational costs such that the limitation of low system link performance at a certain area is circumvented. Similarly, higher performing links may be deployed to enable the implementation of a new RAN function, the enhancement of an existing RAN function and/or reduce system operational costs while circumventing the limited hardware capabilities of RFEs and/or CPs at another area. The performance of system links, RFE and/or CP hardware may also be jointly enhanced to introduce new RAN functions, enhance existing RAN functions and/or reduce system operational costs at any system location. Conversely, the implementation of RAN functions may also be altered to compensate for system link loss and/or CP/RFE failures. Additional CPs and/or RFEs, along with associated system links, may thus be introduced or removed as necessary based on RAN function implementation requirements. Once again, the main focus when introducing, removing and/or upgrading RFEs, CPs and/or system links is to enable the implementation of RAN functions, based on the RAN deployment environment, in the most efficient and cost effective manner while satisfying the system performance requirements.

Referring back to FIG. 6, examples highlighting the flexibility in possible evolution paths for a flexible RAN are provided. Once again, It should be understood that the provided examples are for illustrative purposes only and that other RAN reconfigurations are contemplated. The processing capabilities of RFE3 (213) may be enhanced, along with the performance of the link between RFE1 (211) and RFE3 (213) and the link between RFE3 (213) and the CN (122'''), to enable the removal of RFE2 (212), with the connection of CP3 (203) transferred from RFE2 (212) to RFE3 (213). Similarly, the processing capabilities and links of RFE4 (214) may be enhanced to eliminate the need for RFE5 (215) and RFE6 (216). In addition, the performance of CP1 (201) and CP2 (202) may be enhanced to eliminate the need for RFE1 (211), with CP1 (201) and CP2 (202) reconnected from RFE1 (211) to the enhanced RFE3 (213). The processing burden and link loading of CP8 (208) can be reduced by upgrading CP9 (209) to perform all RTF functions and reconnecting CP9 (209) from CP8 (208) to RFE4 (214). Similarly, CP10 can be upgraded to perform all RAN functions and directly connected to the CN (122'''). On the other hand, a single high performing RFE with high performing links may be deployed to replace all RFEs and enable the replacement of CPs with lower performing CPs to reduce system costs. The evolution path of flexible RAN depends on the availability and performance of network infrastructure hardware and links Although the foregoing has been described with reference to certain specific embodiments, various modifications thereto will be apparent to those skilled in the art without departing from the spirit and scope of the invention as outlined in the appended claims. The entire disclosures of all references recited above are incorporated herein by reference.

We claim:

1. A radio access network system comprising one or more radio access network elements communicatively linked to form at least a portion of a radio access network, the one or more radio access network elements each comprising one or more processors, the system further comprising:
   one or more reconfigurable connection points comprising one or more processors executable to provide all or a subset of radio transmission functions for one or more radio access technologies, the radio transmission functions linking user equipment operating on the radio access technology to the radio access network; and
   one or more reconfigurable radio access network functional elements each executable on at least one of the radio access network elements, each of the radio access network functional elements linked directly or indirectly to one or more of the reconfigurable connection points, each radio access network functional element configurable to provide one or more non-radio transmission functions for enabling communication between the user equipment and a core network linked to the radio access network, each of the radio access network functional elements reconfigurable to permit introduction and removal of non-radio transmission functions.

2. The system of claim 1, wherein each of the reconfigurable connection points is configurable to provide all of the non-radio transmission functions when not connected to one of the reconfigurable radio access network functional elements.

3. The system of claim 1, wherein one of the radio access network functional elements linked to one of the connection points is reconfigurable to provide substantially all of the non-radio transmission functions.

4. The system of claim 1, wherein the selection of the non-radio transmission functions provided by each of the reconfigurable connection points and reconfigurable radio access network functional elements is based on user equipment connectivity requirements.

5. The system of claim 1, wherein the selection of the non-radio transmission functions provided by each of the reconfigurable connection points and reconfigurable radio access network functional elements is reconfigured based on changes in user equipment connectivity requirements.

6. The system of claim 1, wherein the selection of the non-radio transmission functions provided by each of the reconfigurable connection points and reconfigurable radio access network functional elements is based on the performance of radio access network elements and system links.

7. The system of claim 1, wherein the selection of the non-radio transmission functions provided by each of the reconfigurable connection points and reconfigurable radio access network functional elements is reconfigured based on changes in capabilities of network infrastructure hardware or links.

8. The system of claim 7, wherein the changes comprise introduction or removal of network infrastructure hardware or links.

9. A method of deploying a radio access network, at least a portion of the radio access network formed by communicatively linking one or more radio access network elements, each of the radio access network elements comprising one or more processors, the method comprising deploying:
   one or more reconfigurable connection points comprising one or more processors executable to provide all or a subset of radio transmission functions for one or more radio access technologies, the radio transmission functions linking user equipment operating on the radio access technology to the radio access network; and
   one or more reconfigurable radio access network functional elements each executable on at least one of the radio access network elements, each of the radio access network functional elements linked directly or indirectly to one or more of the reconfigurable connection points, each radio access network functional element configurable to provide one or more non-radio transmission functions for enabling communication between the user equipment and a core network linked to the radio access network, each of the radio access network functional elements reconfigurable to permit introduction and removal of non-radio transmission functions.

10. The method of claim 9, wherein each of the reconfigurable connection points is configurable to provide all of the non-radio transmission functions when not connected to one of the reconfigurable radio access network functional elements.

11. The method of claim 9, wherein one of the radio access network functional elements linked to one of the connection points is reconfigurable to provide substantially all of the non-radio transmission functions.

12. The method of claim 9, wherein the selection of the non-radio transmission functions provided by each of the reconfigurable connection points and reconfigurable radio access network functional elements is based on user equipment connectivity requirements.

13. The method of claim 9, wherein the selection of the non-radio transmission functions provided by each of the reconfigurable connection points and reconfigurable radio access network functional elements is reconfigured based on changes in user equipment connectivity requirements.

14. The method of claim 9, wherein the selection the of radio access network functions provided by each of the reconfigurable connection points and reconfigurable radio access network functional elements is based on the performance of radio access network elements and system links.

15. The method of claim 9, wherein the selection the of radio access network functions provided by each of the reconfigurable connection points and reconfigurable radio access network functional elements is adapted in accordance with changes in capabilities of network infrastructure hardware or links.

16. The method of claim 15, wherein the changes comprise introduction or removal of network infrastructure hardware or links.

* * * * *